United States Patent [19]

Waara

[11] 4,080,079
[45] Mar. 21, 1978

[54] UNIVERSAL JOINT

[75] Inventor: William A. Waara, Detroit, Mich.

[73] Assignee: Visi-Trol Engineering Company, Detroit, Mich.

[21] Appl. No.: 757,308

[22] Filed: Jan. 6, 1977

[51] Int. Cl.² .............................................. F16D 3/00
[52] U.S. Cl. ........................................ 403/57; 64/7
[58] Field of Search ................ 403/57, 74, 359; 64/7, 64/8

[56] References Cited

U.S. PATENT DOCUMENTS

| 3,940,946 | 3/1976 | Andersen | 64/8 |
| 3,959,987 | 6/1976 | Garey | 64/8 |

*Primary Examiner*—Wayne L. Shedd
*Attorney, Agent, or Firm*—Gifford, Chandler, Sheridan & Sprinkle

[57] ABSTRACT

A universal joint is provided and comprises a male and female member which are rotatably coupled together even when the members are not in axial alignment with each other. The female member includes a socket with a polygonal cross-sectional shape while the male member includes a spherical portion having polygonal faces circumscribed diametrically therearound. The spherical portion is insertable into the socket whereby the polygonal faces on the spherical portion mesh with the polygonal socket in the female member so that the two members are rotatably drivingly coupled together.

6 Claims, 5 Drawing Figures

U.S. Patent March 21, 1978 4,080,079
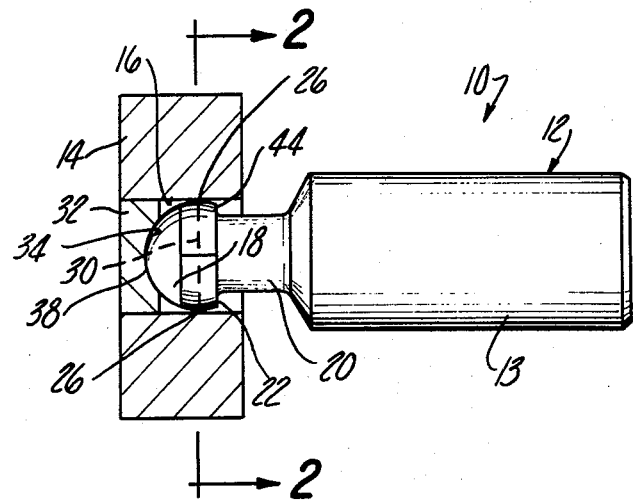
*Fig-1*
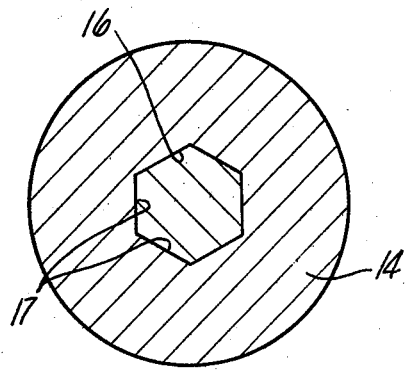
*Fig-2*
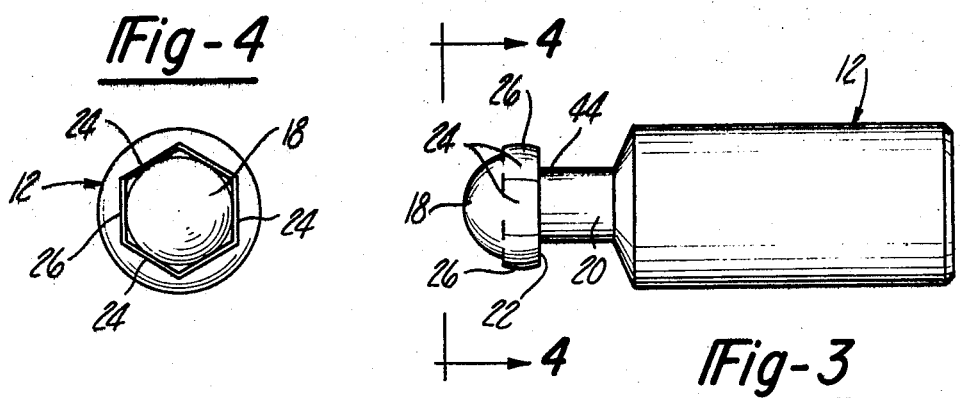
*Fig-4*
*Fig-3*
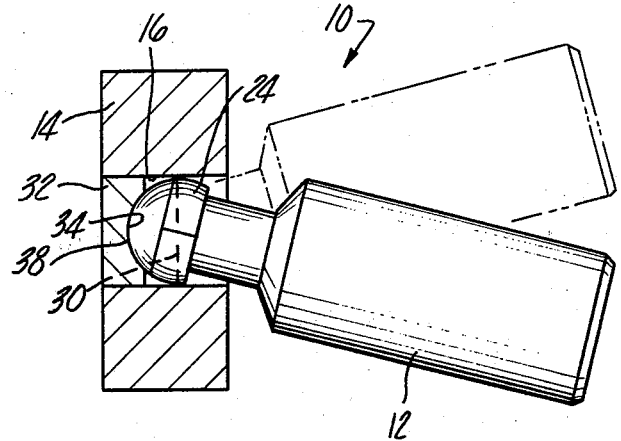
*Fig-5*

UNIVERSAL JOINT

BACKGROUND OF THE INVENTION

I. Field of the Invention

The present invention relates to universal joints and more particularly, to universal joints having a male and female member.

II. Description of the Prior Art

There are a number of previously known universal joints in which a first member is rotatably coupled to a second member despite a misalignment of the axes of rotation of the members. Moreover, several of these previously known universal joints comprise a male and female member wherein the male member includes a male portion which is insertable into a female portion on the other member. The male and female portions are, of course, mechanically coupled so that rotation of either rotatably drives the other.

The previously known universal joints of this latter type, however, suffer many disadvantages unknown to the present invention. A prime disadvantage of this previously known type of universal joint is that the surface contact between the male and female portions is minimal and even further decreases when the male and female portions are axially misaligned. The minimal contact between the male and female portions provides a structurally weak universal joint which is prone to failure under high torque loads between the male and female members.

A still further disadvantage of these previously known universal joints in which only minimal contact is maintained between the male and female portions, is that such joints are noisy in operation. While the noise levels produced from these previously known universal joints has heretofore been ignored or disregarded, the new OSHA standards now provide limitations upon the maximum sound levels which are permissible within working areas. Consequently, continued use of the previously known universal joints oftentimes will violate the OSHA standards.

A still further disadvantage of these previously known universal joints is that such joints are fairly complex in construction and thus necessarily expensive to build. Moreover, many of these previously known universal joints are constructed with a multiplicity of components which additionally increases the overall cost of the universal joint.

SUMMARY OF THE PRESENT INVENTION

The present invention overcomes the above mentioned disadvantages of the previously known universal joints by providing a universal joint of the type including a male and female member which is of simple, inexpensive and yet durable construction. In addition, a relatively large surface area contact is maintained between the male and female members of the universal joint despite a misalignment of the axes of rotation of the members thus reducing vibration and the resultant noise produced by the universal joint during operation.

In brief, the universal joint of the present invention comprises a male member and a female member which are rotatably coupled despite an axial misalignment of the axes of rotation of the members. The female member includes a socket with polygonal cross-sectional shape while the male member includes a spherical portion which is insertable into the socket. In addition, polygonal faces are circumscribed around a diametric portion of the spherical portion, the largest portion of which is slightly smaller or substantially the same as the polygonal cross-sectional shape of the socket.

Thus with the spherical portion of the male member inserted into the socket in the female member, the polygonal faces on the male member meshingly engage with the walls of the socket so that rotation of the male member rotatably drives the female member and, vice versa. An important feature of the present invention is that due to the spherical circumscription of the polygonal faces around the spherical portion on a male member the polygonal faces are also curved and substantially the same surface contact is maintained between the male and female members regardless of the axial misalignment of the members.

A still further advantage of the universal joint of the present invention is that both the male and female members can be integrally constructed. This integral construction, of course, eliminates the necessity and cost of additional components contained within the universal joint and also increases the overall structural strength of the universal joint.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a side cross-sectional view illustrating the universal joint of the present invention;

FIG. 2 is a cross-sectional view taken substantially along line 2—2 in FIG. 1;

FIG. 3 is a side plan view illustrating the male member of the universal joint of the present invention;

FIG. 4 is a plan view taken substantially along line 4—4 in FIG. 3; and

FIG. 5 is a side cross-sectional view of the universal joint of the present invention similar to FIG. 1 but showing the male member axially misaligned with the female member.

DETAILED DESCRIPTION OF THE PRESENT INVENTION

With reference to FIG. 1 the universal joint 10 of the present invention is thereshown and comprises a male member 12 and a female member 14. Although in FIG. 1 the male member 12 is illustrated as being formed on the end of a shaft 13 while the female member 14 is illustrated as a part of a hub, it will be understood, of course, that either member 12 or 14 could be formed as a part of a shaft or a hub without deviation from the spirit of the invention.

As best shown in FIGS. 1 and 2, the female member 14 includes a socket 16 with faces 17 so that the socket 16 is polygonal, and preferably hexagonal, cross-sectional shape. In addition, the socket 16 is coaxial with the axis of rotation of the female member 14.

With reference to FIGS. 1, 3 and 4, a male portion 44 is attached to one axial end of the male member 12. The male portion 44 further includes a ball or spherical portion 18 such that the center of the spherical portion 18 is coaxial with the axis of rotation of the male member 12. The ball portion 18 is preferably integrally formed with the male member 12 and includes a stem 20 which connects the ball portion 18 to the shaft 13. For a reason to be hereafter described, the stem 20 is preferably of a smaller diameter than the ball portion 18 and, if desired, the ball portion 18 can be terminated by a flat annular abutment surface 22 adjacent the stem 20.

A series of faces 24 are formed around a diametric portion of the ball portion 18 such that the faces 24 circumscribe the ball portion 18. Thus, due to the circumscription of the faces 24 around the ball portion 18, the plane of the faces 24 curve longitudinally at substantially the same radius as the ball portion as is indicated at 26.

As best shown in FIG. 4, the male portion 44 is polygonal in transverse cross-section through the faces 24. The faces 24 correspond in number to the faces 17 within the socket 16 on the female member 14. Moreover, due to the circumscription of the faces 24 around the ball portion 18, the diametric cross-sectional area of the male portion 44 perpendicular to the axis of rotation of the male member 12 is polygonal in shape. The cross-sectional area of the male portion 44 remains polygonal but decreases in total area as the cross-section is moved axially away from an intermediate section of the ball portion 18 of maximum cross-sectional area due to the curvilinear nature 26 of the faces 24.

The aforementioned maximum diametric cross-sectional area of the male portion 44 is substantially the same, or slightly less, than the cross-sectional area of the socket 16 so that upon insertion of the ball portion 18 into the socket 16, the polygonal faces 24 closely abut against the faces 17 in the socket 16. With reference to FIG. 1, as the male member 12 and female member 14 are axially aligned, a diametric annular and preferably continuous abutting contact indicated at 30 is established between the faces 24 on the male portion 44, and the socket 16 so that the abutting contact 30 is substantially coaxial with the axis of rotation of the female member. However, due to the curvilinear nature 26 of the faces 24, the remainder of the polygonal faces 24 are spaced away from the socket faces 17 in a gradually increasing manner.

With reference now to FIG. 5, the axis of rotation of the male member 12 is thereshown misaligned with the axis of rotation of the female member 14. In this situation, the annular area of contact 30 between the polygonal faces 24 of the male portion 44 and the socket walls 17 remains coaxial with the female member 14 but is acutely angled with respect to the axis of the male member 12. However, even with the axes of rotation of the male and female members 12 and 14 misaligned as shown in FIG. 5, the annular area of abutment 30 between the male portion 44 and the socket walls 17 is substantially the same due to the circumscription of the faces 24 around the ball portion 18. Consequently, the area of engagement between the male member 12 and the female member 14 remains substantially the same despite the degree of axial misalignment between the members 12 and 14.

With the universal joint 10 of the present invention in the configuration illustrated in either FIG. 1 or FIG. 5 rotation of either the male member 12 or the female member 14 rotatably drives the other due to the meshing engagement of the polygonal faces 24 on the male portion 44 with the socket 16. Since the plane of the faces 24 curve longitudinally at the same radius of curvature as the ball portion 18, the male portion 44 can pivot within the socket 16 to thereby compensate for any misalignment between the axes of rotation of the members 14 and 12.

Preferably the female member 14 includes a bearing plate 32 at one end of the socket 16. A spherical recess 34 is formed within the plate 32 coaxially with the axis of rotation of the female member 14. The spherical recess 34 receives and abuts against the outwardly extending end 38 of the ball portion 18 on the male member 12 and limits the axial extension of the ball member 18 within the socket 16 while still permitting the ball portion 18 to pivot within the socket 16. The reduced diameter stem 20 on the male member 12, of course, also eliminates any interference between the male member 12 and the female member 14 as the male portion 44 pivots within the socket 16.

The universal joint 10 of the present invention thus achieves many advantages unknown to the previously known universal joints. In particular, by the construction of the curvilinear faces 24 on the male member 12, the male member 12 can pivot relative to the female member 14 while retaining substantially the same annular abutment or contact surface 30 between the male member 12 and the female member 14 regardless of the degree or direction of axial misalignment between the members 12 and 14.

A still further advantage of the present invention is that both the male member 12 with its integrally constructed male portion 44 and also the female member 14 can be easily, rapidly and inexpensively constructed.

Moreover, since the annular abutment surface 30 between the male and female members 12 and 14 is substantially continuous around the entire annular surface of the faces 24, the universal joint 10 is of rugged and sturdy construction and thus unlikely to fail from fatigue even under extreme torque loads.

It is apparent that with suitable modifications, a plurality of connected male and female members can be provided to span a rather long distance. Careful alignment between the driving member such as a motor and the driven member is made unnecessary by such an arrangement.

Having thus described my invention, many modifications thereto will become apparent to those skilled in the art to which it pertains without deviation from the spirit of the invention as defined by the scope of the appended claims.

I claim:

1. A universal joint comprising:
a male member adapted to rotate around an axis and a female member, said female member having a socket formed therein with a regular polygonal cross-sectional shape, the male member having a male portion, said male portion comprising a ball portion with polygonal faces diametrically circumscribed around only a portion of the ball member to thereby form curved faces which are linear in transverse cross-section, wherein the axially forward end of said male portion is spherical in shape, and a bearing plate attached to said female member, said bearing plate having a semi-spherical recess formed therein and having the same radius as said ball portion, wherein the male portion is insertable into the socket so that the curved, polygonal faces on the ball portion abut against and drivingly engage the polygonal socket in the female member while said spherical end of said male portion ball portion bears against said bearing plate recess.

2. The invention as defined in claim 1 wherein the diametric cross-sectional area of the male portion taken through the curved, polygonal faces is substantially the same as the cross-sectional area of the socket in the female member.

3. The invention as defined in claim 1 wherein the male portion and the socket are both hexagonal in cross-sectional shape.

4. The invention as defined in claim 1 wherein the socket is coaxial with the axis of rotation of the female member.

5. The invention as defined in claim 1 and including a reduced diameter stem for attaching the male portion to the male member.

6. The invention as defined in claim 5 wherein the male portion, stem and male member are integrally constructed.

* * * * *